Patented Mar. 19, 1940

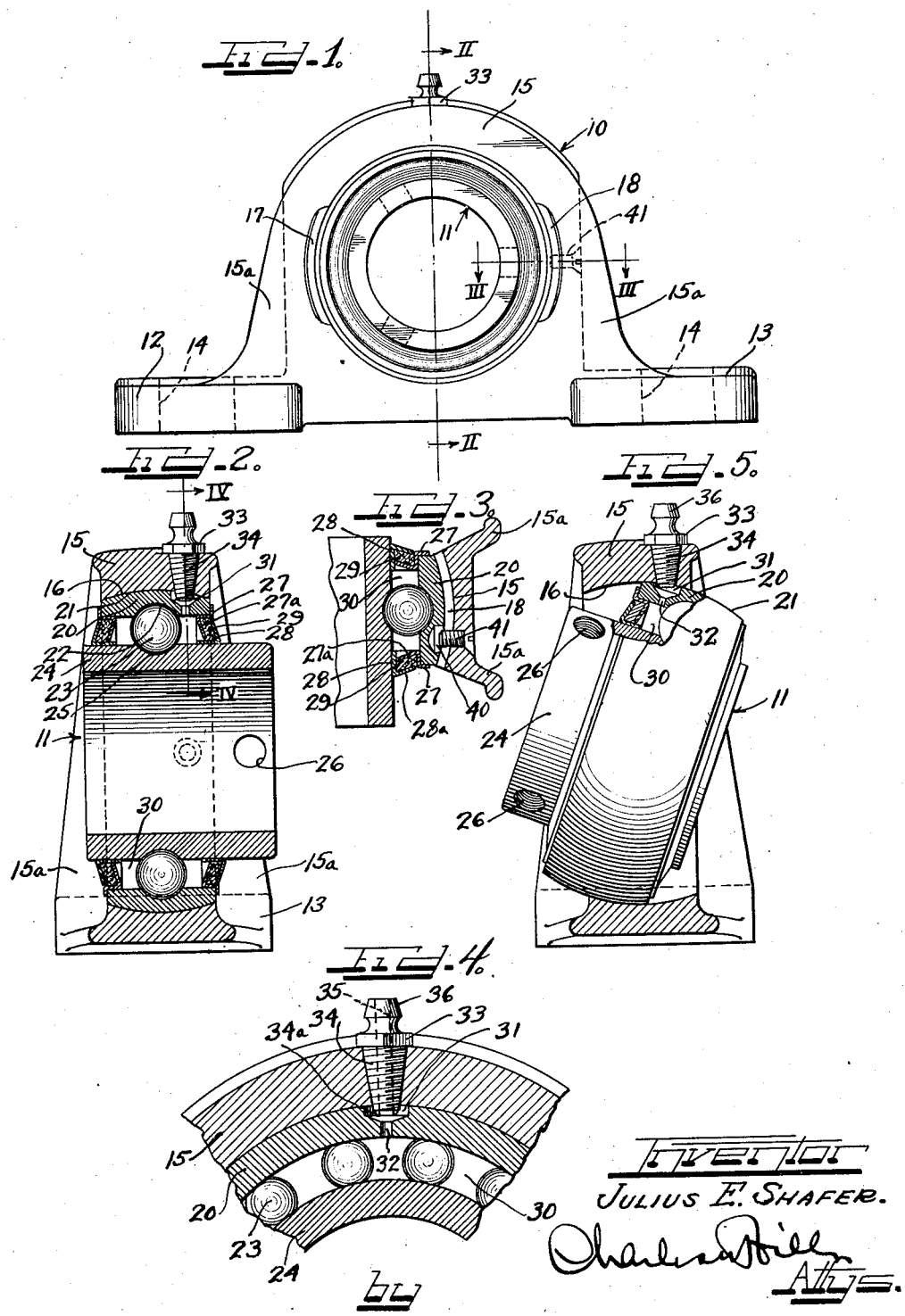

2,194,328

UNITED STATES PATENT OFFICE 2,194,328

BEARING ASSEMBLY

Julius E. Shafer, Chicago, Ill., assignor to Monad Corporation, Chicago, Ill., a corporation of Illinois Application February 21, 1938, Serial No. 191,614

3 Claims. (Cl. 308—187)

This invention relates to mountings for sealed bearing units in housings permitting limited universal movement of the sealed units therein and includes lubrication of the interior of the sealed unit through the housing. More specifically the invention relates to the holding of a sealed bearing unit outer race ring in a one-piece pillow block or other housing to insure lubricant passage through the pillow block or housing to the anti-friction elements of the bearing unit while permitting universal movement between the outer race ring and the pillow block or housing, which movement is limited sufficiently to prevent entry of dirt or other fouling material between the outer race ring and the pillow block or housing.

It has heretofore been proposed to mount bearing units in one piece hangers by cutting diametrically opposed slots across the inner annular concave wall of the hanger. The outer convex race ring of a bearing unit was then inserted in the slots and the bearing tilted 90° into seated position in the pillow block.

Such assemblies, however, are difficult to lubricate, and heretofore it has been the practice to lubricate the antifriction elements of the bearing through the sealing rings or sides of the bearing units. This practice is objectionable since it requires expensive side wall constructions for the bearing and since lubricant fittings on the side walls of the bearing are difficultly accessible.

I have now provided bearing assemblies wherein a sealed bearing unit is lubricated through the hanger or housing in which it is assembled.

According to this invention the convex or segmental spherical outer bearing wall of the bearing unit outer race ring is seated on the concave inner bearing wall of a pillow block by inserting the bearing unit into the known slot construction of the pillow block and by tilting the thus inserted bearing unit 90° into seated position.

In one embodiment of the invention, the outer race ring has a dimple or closed perimeter depression therein communicating with the interior of the bearing alongside of the anti-friction elements therein. The dimple is offset from the great circle of the race ring so that a straight bore can be drilled from the bottom of the dimple through the race ring to terminate alongside of the anti-friction elements. It is additionally desirable to offset this dimple from the great circle of the outer race ring because the race ring is very thin at the great circle of the ring due to a groove formed in the center of the ring for receiving the anti-friction elements.

A lubricant fitting is threaded through the pillow block or housing and extends into the dimple to hold the bore or passageway through the race ring in communication with the fitting. The portion of the fitting extending into the dimple is smaller than the dimple to allow limited universal movement between the race ring and pillow block or other housing.

In another embodiment of the invention, the outer race ring of the bearing has a second dimple or closed perimeter depression therein spaced about 90° from the above described dimple. This second dimple receives a set screw or pin therein that is threaded through the pillow block or housing to hold the bearing unit against rotation about the axis of the lubricant fitting. This set screw or pin cooperates with the lubricant fitting to hold the sealed bearing unit in the pillow block or other housing against movement sufficient to expose the cooperating bearing walls of the bearing unit and pillow block for the collection of dirt or fouling matter thereon that would interfere with free operation of the assembly.

The set screw and lubricant fitting, however, do permit limited universal movement of the bearing unit in its housing. The bearing unit is therefore self-aligning.

It is then an object of this invention to lubricate sealed bearing units through housings or hangers in which the units are mounted.

More specifically, it is an object of this invention to mount a sealed bearing unit in a pillow block and to so limit the movement between the outer race ring of the bearing unit and the pillow block to insure lubrication of the unit from a lubricant fitting mounted on the pillow block.

Another object of this invention is to lubricate sealed bearing units universally mounted in housings such as pillow blocks, take up units, flange units, hanger boxes, and the like, through the housing and outer race ring of the unit.

Another object of this invention is to utilize a lubricant fitting secured in a sealed bearing unit receiving housing for locking the unit in the housing as well as for introducing lubricant into the unit.

A further object of this invention is to seat locking means in closed perimeter depressions formed in the outer race rings of bearing units for holding the units in pillow blocks to prevent entry of dirt between the units and the pillow blocks.

Other and further objects of this invention will be apparent to those skilled in the art from the following detailed description of the annexed sheet of drawings which discloses a preferred embodiment of the invention.

On the drawing:

Figure 1 is a side elevational view of a bearing assembly according to this invention illustrating a sealed bearing unit mounted in a one-piece pillow block.

Figure 2 is a vertical cross-sectional view, with parts in elevation, taken substantially along the line II—II of Figure 1.

Figure 3 is a fragmentary horizontal cross-sectional view, with parts in elevation, taken substantially along the line III—III of Figure 1.

Figure 4 is a fragmentary vertical cross-sectional view, with parts in elevation, taken along the line IV—IV of Figure 2.

Figure 5 is a vertical cross-sectional view, with parts in elevation, taken through the longitudinal center of a bearing assembly according to this invention and illustrates the bearing unit in a cocked position, which position is prevented by a modification of this invention.

As shown on the drawing:

In Figure 1, the reference numeral 10 designates generally a one-piece pillow block having a sealed bearing unit 11 mounted therein.

The pillow block 10 comprises feet 12 and 13 having holes or slots 14 formed therethrough for receiving bolts to rigidly attach the pillow block on a supporting structure (not shown). An annular strap portion 15 is formed intermediate the feet 12 and 13 and is provided with a concave segmental spherical inner face or bearing wall 16.

The annular strap portion 15 of the pillow block has outwardly extending web or wing portions 15a sloping from the top of the strap to the feet 12 and 13 for reinforcing the construction.

Slots or grooves 17 and 18 are formed on diametrically opposite sides of the inner bearing wall 16 of the strap 15. These slots or grooves are adapted to receive the sealed bearing unit 11 therein when the unit is in a horizontal position. This unit when thus inserted in the slots 17 and 18 can be tilted 90° into a vertical position to be seated on the bearing wall 16 of the strap.

As best shown in Figure 2, the sealed bearing unit 11 comprises an outer race ring 20 having a convex segmental spherical outer bearing wall 21 for cooperation with the concave bearing wall 16 of the strap 15.

An annular groove 22 is formed in the central portion of the inner face of the outer race ring for receiving ball bearings 23 therein.

An inner race ring 24 is inserted through the race ring 20 in spaced relation therefrom. The inner race ring 24 has an annular groove 25 on its outer face adapted to be aligned with the groove 22 of the outer race ring to receive the ball bearings 23.

The inner race ring 24 preferably projects laterally beyond the outer race ring 20 and has a plurality of threaded apertures 26 in this projecting portion. Locking pins or set screws are adapted to be threaded through the apertures 26 for locking the inner race ring to a shaft.

Sealing rings or slingers 27 are pressed into opposite sides of the outer race ring 20. These rings have inwardly projecting flange portions 27a extending towards the inner race ring 24.

Sealing rings or slingers 28 are likewise pressed on the inner race ring 24 and include outwardly extending flange portion 28a extending in spaced relation outwardly of the flanges 27a. Compressible washers or sealing gaskets 29 are interposed between the flanges 27a and 28a of the sealing rings. These washers or gaskets can be cemented or glued to the sealing rings 28 so as to travel therewith.

The sealing means define with the inner and outer race rings a sealed annular chamber 30 for the ball bearings 23.

The chamber 30 is adapted to be packed with lubricant at the time the bearing unit 11 is assembled. However, after assembly of the unit, it is obvious that the sealing rings would have to be pried off of the race rings to permit further lubrication of the ball bearing unless an outside lubricating structure is provided.

Therefore, according to this invention, the chamber 30 can be supplied with lubricant after the bearing unit is assembled without disassembly of the unit.

For the purpose of lubricating the chamber 30, a dimple or closed perimeter depression 31 is formed in the outer race ring 20. This dimple 31 is preferably spaced from the great circle of the outer race ring so that a straight hole 32 can be drilled from the bottom of the dimple to communicate with the chamber 30 alongside of the ball bearings 23. If the dimple 31 were formed in the center of the outer race ring, the same obviously could not be very deep because the race ring is quite thin at this point due to the groove 22 therein. In addition the hole 32 should not open on the groove 22 since the ball bearings 23 would intermittently stop the passageway provided by the hole and will tend to wear away the mouth of the hole thereby imparting resistance to smooth operation of the bearing.

It likewise is not feasible to drill a slanting hole from the dimple 31 to the chamber 30. Therefore, according to this invention, the depression or dimple 31 is offset from the center of the outer race ring.

A lubricant fitting 33 having a tapered threaded shank 34 is threaded through the strap 15 of the pillow block 10 preferably at the top of the pillow block. The tapered shank 34 is of sufficient length to project beyond the concave bearing wall 16 of the strap 15 into the dimple 31 of the outer race ring 20. This projecting end 34a of the shank 34 is of smaller diameter than the dimple 31 so that the outer race ring 20 can be moved universally to a limited extent relative to the strap 15.

The fitting 33 has a bore 35 therethrough to convey lubricant to the dimple 31. The bearing wall 21 of the outer race ring 20 is in full seating engagement with the bearing wall 16 of the strap 15, at all points around the dimple 31. Therefore, lubricant forced through the bore 35 of the fitting 34 by means of a grease gun (not shown), engaging the head 36 of the fitting is necessarily forced through the passageway 32 in the bottom of the dimple into the chamber 30 for lubricating the ball bearings therein.

From the above description it is obvious that the lubricant fitting serves a dual function of (1) conveying lubricant to the interior of a sealed bearing unit through a housing in which the unit is mounted and (2) locking the sealed bearing unit in the housing while, however, permitting limited universal movement of the bearing so that the same may be self-aligning.

The lubricant fitting 33 permits free rotation of the bearing unit 11 about its axis and, therefore, if the unit is rotated 180° from its proper position, it will be cocked or tilted as shown in Figure 5. Such tilted or cocked position exposes the outer bearing wall 21 of the outer race ring 20 and the inner bearing wall 16 of the strap 15. Dirt or other fouling material can thus collect on these exposed surfaces and will be carried between the surfaces when the unit is rotated back into proper position thus interfering with the efficient self-aligning operations of the bearing.

In order to prevent such exposure of bearing surfaces, especially before the bearing assemblies are mounted for operation, a second dimple or closed perimeter depression 40 (Figure 3) can be formed in the outer race ring 20 preferably at right angles to the above described dimple or depression 31.

A set screw or locking pin 41 is then threaded through the strap 15 of the pillow block so that the end thereof projects into the dimple 40.

The set screw 41 and dimple 40 thereby cooperate to limit rotation of the bearing unit about the axis of the lubricant fitting and prevent the condition illustrated in Figure 5. The set screw 41 is of smaller diameter than the depression 40 so that the bearing unit will have limited universal movement in the pillow block. This set screw is primarily useful in holding the bearing unit in full seating position in the pillow block until a shaft is mounted through the bearing unit and the pillow block is secured on a support. This set screw thus acts as an aligning means for the bearing unit and pillow block prior to the mounting of this assembly.

If a very long shank is required for the lubricant fitting in order to project into the dimple 31, it should be understood that a hollow exteriorly threaded tube can be threaded into the strap 15 for projecting into the dimple 31. A lubricant fitting with a short shank can then be threaded into the strap above the tube.

It should be also understood that the shank of the lubricant fitting need not be tapered as illustrated.

It will, of course, be understood that various details of construction may be varied through a wide range without departing from the principles of this invention, and it is therefore not the purpose to limit the patent granted hereon otherwise than necessitated by the scope of the appended claims.

I claim as my invention:

1. In a bearing assembly including a housing having an interior annular bearing wall and a sealed bearing unit having an outer race ring provided with an exterior annular bearing wall for seating on the housing bearing wall, the improvements which comprise said exterior bearing wall of the bearing unit having a closed perimeter dimple therein, said dimple having a small bore extending therefrom to the interior of the bearing unit, a retaining means extending from the housing bearing wall into the dimple, said retaining means being larger than said bore but fitting freely in the dimple, and said retaining means having a lubricant duct therethrough whereby said bearing unit is locked in the housing in constant communication with a lubricant supply duct.

2. In a bearing assembly including a housing having an interior concave annular bearing wall with diametrically opposed transverse slots therein, and a sealed bearing unit having an outer race ring provided with an exterior annular convex wall for cooperation with the concave wall of the housing, said unit adapted to be inserted in said slots and tilted into seated position in said housing, the improvements which comprise said exterior convex wall of the bearing unit having a closed perimeter dimple therein, said dimple having a bore extending from the bottom of the dimple to the interior of the bearing unit, a retaining means having a duct therethrough extending from the concave wall of the housing into the dimple, said retaining means having an outer periphery smaller than the dimple but larger than the bore, and means extending from the outer wall of the housing in communication with said duct for attachment to a source of lubricant whereby the bearing unit is locked for limited universal movement in the housing and is in constant communication with a lubricant supply duct.

3. In a bearing assembly including a housing having an interior annular wall and a sealed bearing unit having an outer ring provided with an exterior annular wall for seating on said interior annular wall of the housing, the improvements which comprise said exterior wall of the bearing unit having a closed perimeter dimple therein, said dimple having a bore extending therefrom to the interior of the bearing unit, said housing having a bore therethrough adapted to communicate with said dimple, a retaining means in said bore of the housing extending from the interior wall of said housing into the dimple, said retaining means being disposed freely in the dimple, means on the outside of the housing adapted for receiving lubricant, said means being in communication with said retainer, and said retainer providing a passageway through the housing to the dimple and into the bearing unit whereby said bearing unit is locked in the housing and is in constant communication with a lubricant supply.

JULIUS E. SHAFER.